April 13, 1926.
G. F. ROHN
ELECTRIC CABINET
Filed Jan. 30, 1922
1,580,334
2 Sheets-Sheet 1
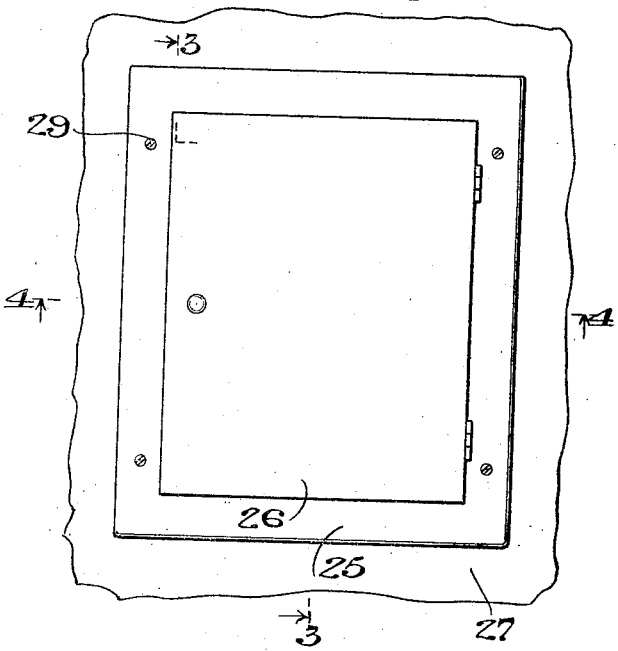
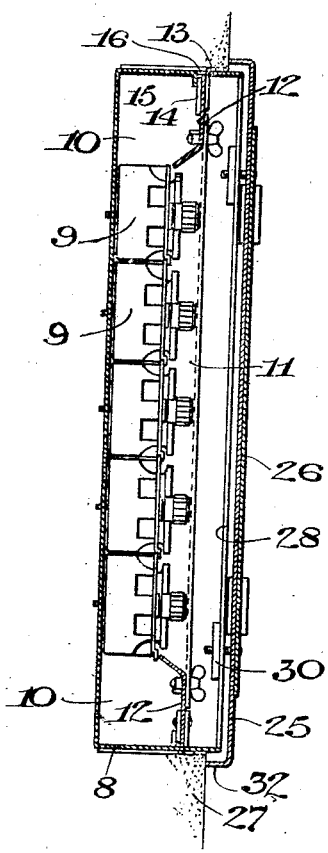
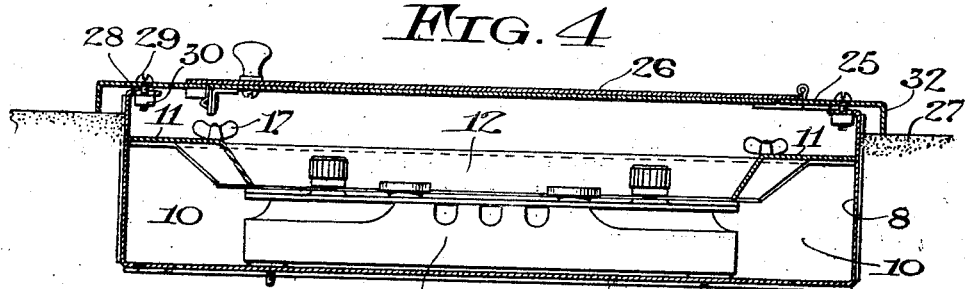
WITNESSES
INVENTOR
George F. Rohn,
By R. C. Caldwell
ATTORNEY April 13, 1926.  
G. F. ROHN  
ELECTRIC CABINET  
Filed Jan. 30, 1922  
1,580,334  
2 Sheets-Sheet 2
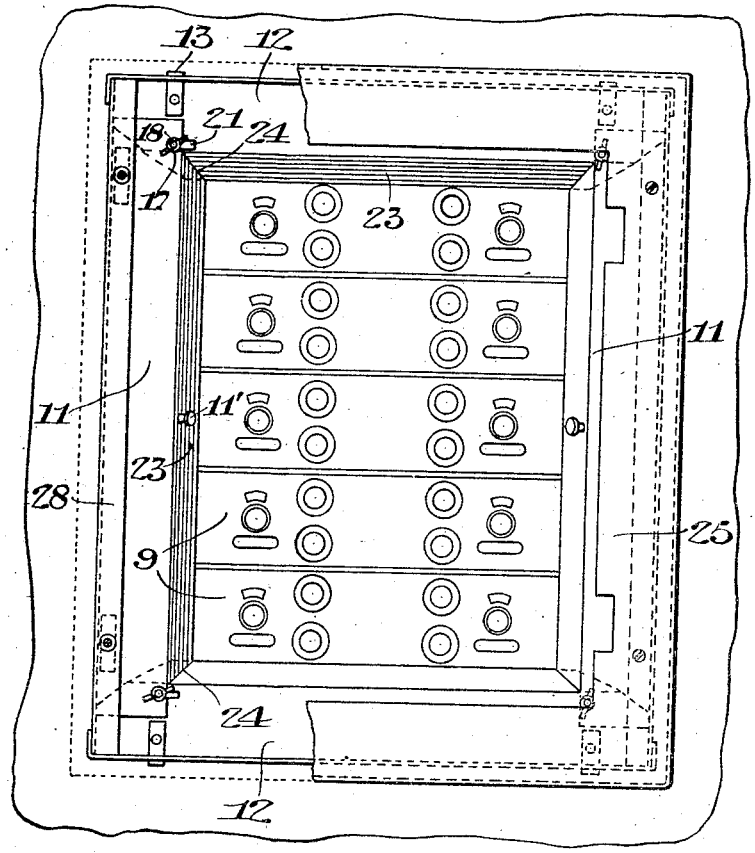
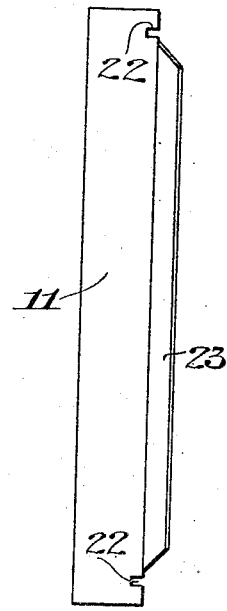
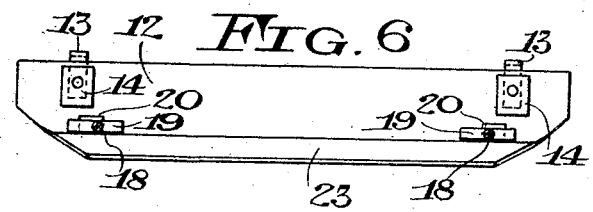
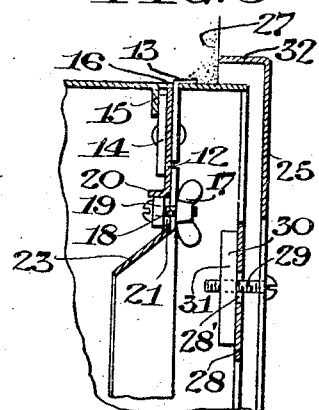
WITNESSES  
INVENTOR  
George F. Rohn  
ATTORNEY Patented Apr. 13, 1926.

1,580,334

UNITED STATES PATENT OFFICE.

GEORGE F. ROHN, OF MILWAUKEE, WISCONSIN, ASSIGNOR TO GEORGE F. ROHN ELECTRIC COMPANY, OF MILWAUKEE, WISCONSIN, A CORPORATION OF WISCONSIN.

ELECTRIC CABINET.

Application filed January 30, 1922. Serial No. 532,799.

*To all whom it may concern:*

Be it known that I, GEORGE F. ROHN, a citizen of the United States, and resident of Milwaukee, in the county of Milwaukee and State of Wisconsin, have invented new and useful Improvements in Electric Cabinets, of which the following is a description, reference being had to the accompanying drawings, which are a part of this specification.

The invention relates to electric cabinets.

In the usual cabinets having gutters or wiring compartments access to said compartments cannot be had without removing the front plate or front side of the cabinet and this is particularly true and exceedingly objectionable in those cabinets which are set into the wall of a building, because the removal and replacement of the front wall of the cabinet invariably mars the setting, such as the plaster wall or woodwork adjacent the cabinet. To overcome these difficulties, I have provided a cabinet in which the covers or enclosures of the wiring compartment may be removed from the cabinet through the opening afforded by the door without disturbing other parts of the cabinet.

A further object of the invention is to provide covers for the wiring compartment which may be readily and quickly applied to or removed from the cabinet.

In cabinets of the built-in type it is always a difficult matter to attach the face plate to the cabinet where the body of the cabinet has been previously installed prior to finishing the building, and another object of the present invention is to provide simple and efficient means for connecting the face plate to the body of the cabinet, under such conditions, so that the face plate may be properly set even though the box itself is not.

With the above and other objects in view the invention consists in the device and the several features thereof hereinafter described and all equivalents.

In the drawing: Fig. 1 is a front view of a device embodying the invention; Fig. 2 is a view similar to Fig. 1 with the door removed and parts of the front plate broken away; Fig. 3 is a section taken on the line 3—3 of Fig 1; Fig. 4 is a section taken on the line 4—4 of Fig. 1; Fig. 5 is an enlarged detail view of parts shown in Fig. 3; Figs. 6 and 7 are detail views of the compartment covers.

In the drawings the numeral 8 designates a sheet metal box or casing forming the body of the cabinet and where, as in the construction shown, the cabinet is of the gutter or wiring compartment type, the electrical devices 9 are mounted in said box at a distance from the side walls to form a gutter 10 extending around them, which gutter forms a wiring compartment receiving the conductors that lead to or from the electrical devices 9, which may be of various kinds.

To enclose the wiring compartments, I provide a sectional covering composed of a pair of sections 11 and a pair of sections 12. Either set of sections 11 or 12 may be detachably connected to the walls of the box while the other set is secured to the sections so connected. In the present instance each of the end cover sections 12 is provided with hooks 13 and pads or blocks 14 alined therewith. The end walls of the box have portions punched therefrom to form ledges 15 and slots 16, so that the hooks may interlock with the sides of the box at the same time the blocks 14 rest upon the ledges 15, thus retaining these covers in place. This connection permits these sections being attached from inside the box and obviates the use of bolts or screws. The sections 11 are connected to the sections 12 by means of bolts and wing nuts 17. The sections 11 are provided with knobs 11' to facilitate handling them. The bolts are formed by machine screws 18 provided with elongated blocks 19 which cooperate with tongues 20 punched from the sections 12 to prevent the screws from turning when the wing nuts are screwed up. The elongated openings 21 formed by the punching out of the tongues 20 and the slots 22 in the ends of the sections 12 are adapted to receive the bolts and permit longitudinal movement of said bolts to facilitate attachment of the sections 11 to sections 12 by a loosening of the wing nuts 17 without their entire removal from the bolt so that the sliding of the bolts out of engagement with the slots 22 permits the sections 11 being lifted off of the sections 12.

Both sets of cover sections 11 and 12 have lateral inclined flanges 23, the depth of which may vary with the particular type or kind of electrical apparatus mounted in the cabinet, but such flanges preferably extend down to or close to the central panel portion of the cabinet to protect and prevent tampering with the conductors in the wiring compartment. The flanges for the sections 11 have bevelled or inclined end edges 24 to engage the inclined flanges of the sections 12. The covering for the wiring compartment presents a marginal frame effect for the electrical apparatus in the box and improves the appearance of the cabinet, particularly where all the wires or leads to such apparatus come to the devices below their outer or exposed surfaces, as in the illustration shown in the drawing.

This covering may also be removed from the cabinet without taking off the face plate 25 or the front side of the cabinet provided with the hinged door 26, which is of great advantage where the box is mounted or built into the building and the face plate comes in contact with the plastered wall 27 or wood framework.

In order that the box itself may be put in during the course of construction and the face plate be put on after the building is finished and be secured in proper alined position for varying positions of the box, I provide the front flanges 28 of the box with enlarged openings 28' for the screws 29 which pass through the face plate 25 and into non-rotatable nuts 30 formed by blocks 31 engageable with the side wall of the box. The play of the screws 29 in the openings 28 permits a wide range of adjustment of the face plate in all directions with respect to the front of the box so that said plate will be accurately alined or set when the screws 29 are turned to bring the flanged edge 32 of said plate against the plaster wall 27.

I desire it to be understood that this invention is not to be limited to any specific form or arrangement of parts except in so far as such limitations are specified in the claims.

What I claim as my invention is:

1. The combination with an electric cabinet of the built-in type having a wiring compartment and a face plate projecting over said compartment and having an opening, of sectional covers for the wiring compartment, and means for mounting said covers in the cabinet and permitting of their removal from behind said face plate through said opening.

2. The combination with an electric cabinet of the built-in type having communicating side gutters forming a wiring compartment and a face plate projecting over said compartment and having an opening, of a cover for each gutter, means for connecting said covers together to form a sectional covering for the wiring compartment, and means for supporting said sectional covering from sides of the cabinet, said covers being removable from behind said face plate through said opening.

3. In an electric cabinet having communicating side gutters forming a wiring compartment, the combination of a cover for each gutter, means including hooks connected to oppositely disposed covers for supporting the sectional covering formed by the covers, and means for connecting the other covers to the first named set of covers.

4. In an electric cabinet having a side gutter, the combination of a cover for said gutter provided with hooks and pads, the side of said cabinet having openings through which said hooks are inserted, and ledges upon which said pads rest when said cover is in operative position.

5. In an electric cabinet having communicating side gutters forming a wiring compartment, the combination of a cover for each gutter, one set of oppositely disposed covers being provided with hooks and blocks, the sides of the cabinet with which this set of covers cooperate having openings through which said hooks are inserted and ledges upon which said blocks rest when the covers with the hooks are in operative position, and means connecting the other set of covers with the first named set.

6. In an electric cabinet having communicating side gutters forming a wiring compartment, the combination of a cover for each gutter, means for detachably connecting one set of oppositely disposed covers to the adjacent sides of the cabinet, the ends of the other set of covers abutting the ends of the first set of covers, said covers having slots, and clamping means slidably mounted in said slots for securing the covers together.

7. In an electric cabinet having communicating side gutters forming a wiring compartment, the combination of a cover for each gutter, means including hooks for detachably connecting one set of oppositely disposed covers to the adjacent sides of the cabinet, the ends of the other set of covers abutting the ends of the first set of covers, said covers having slots, and clamping means slidably mounted in said slots for securing the covers together.

8. In an electric cabinet having communicating side gutters forming a wiring compartment, the combination of a cover for each gutter, means including integral inwardly projecting parts of sides of the cabinet at a distance from its front edge for supporting oppositely disposed covers thereon in rearwardly spaced relation to said front edge, and means for connecting the other covers to the first-named set of covers.

In testimony whereof, I affix my signature.

GEORGE F. ROHN.